United States Patent [19]

Schmidt et al.

[11] Patent Number: 4,691,424

[45] Date of Patent: Sep. 8, 1987

[54] PIPE CAP EXTRACTOR APPARATUS

[75] Inventors: E. Michael Schmidt, Carmel; P. Michael Price, Greencastle, both of Ind.

[73] Assignee: Harte Industries, Inc., Carmel, Ind.

[21] Appl. No.: 819,284

[22] Filed: Jan. 16, 1986

[51] Int. Cl.[4] .............................................. B23P 19/04

[52] U.S. Cl. ..................................... 29/261; 29/426.5; 29/262

[58] Field of Search ............... 29/261, 262, 259, 426.5

[56] References Cited

U.S. PATENT DOCUMENTS

| | | | |
|---|---|---|---|
| 520,258 | 5/1894 | Davis | 29/262 X |
| 1,134,581 | 4/1915 | Barret | 29/262 X |
| 1,231,254 | 6/1917 | Hancock | 29/262 |
| 2,118,754 | 5/1938 | Bergert | 29/261 |
| 2,288,906 | 7/1962 | Kaplan | 29/260 |
| 3,402,455 | 9/1968 | Converse | 29/261 |
| 4,019,233 | 4/1977 | Jirele | 29/261 |
| 4,031,603 | 6/1977 | Schultz | 29/259 X |
| 4,123,838 | 11/1978 | Magauero | 29/261 |

*Primary Examiner*—Charlie T. Moon

*Attorney, Agent, or Firm*—Woodard, Weikart, Emhardt & Naughton

[57] ABSTRACT

A tool for removing a cap from a pipe. A torque screw is threadedly mounted to a frame having a pair of downwardly extending legs to which is attached a ring slippable over and against a sewer pipe. A pair of fingers are pivotally and rotatably mounted to an end of the screw and are positionable between the end cap and the end of the sewer pipe. Rotation of the screw forces the fingers and cap apart and away from the ring and pipe.

11 Claims, 3 Drawing Figures

PIPE CAP EXTRACTOR APPARATUS

BACKGROUND OF THE INVENTION

This invention is in the field of devices for removing end caps from tubes. More specifically, the device disclosed herein is utilized to remove end caps or closures from a sewer pipe. In the development of residential housing, it is the practice to initially install a main sewer pipe extending along the length of the street. The pipe includes a separate lateral pipe or extension for each lot adjacent the street. The lateral pipe is initially closed by a removable cap and buried five to ten feet beneath ground level. As individual houses are constructed, the contractor must connect the sewer outlet extending from the house to the lateral sewer pipe. Thus, a hole must be dug extending to the lateral pipe with the end closure then being removed to facilitate the connection between the lateral pipe and the sewer outlet. In many cases, such a connection must take place under wet and/or cold conditions and within a relatively small hole dug in the ground thereby aggravating the condition of cap removal and sewer pip interconnection.

It is the custom to produce the lateral pipe and end cap from plastic with an O-ring seal being provided in the pipe to sealingly engage the end cap. Thus, the end cap is not easily removable requiring the workman to pry and in many cases strike the cap with a heavy tool. Further, internal pipe pressures may increase the force required for removal of the end cap. Frequently, the lateral pipe will crack due to the workman's attempt to remove the end cap particularly when the plastic pipe and cap are subjected to cold temperatures. Fracture of the lateral pipe necessitates the repair thereof causing construction downtime. Such a delay adds to the construction cost of the project in view of the equipment, such as a backhoe and manpower costs incurred. In addition, a coupling is typically required in the case of a fractured pipe adding further to the cost of the sewer interconnection. Disclosed herein is a tool which is easily mounted to the lateral sewer pipe for very fast and easy removal of the end cap with the possibility of pipe fracture being eliminated.

SUMMARY OF THE INVENTION

One embodiment of the present invention is an extractor for removing an end cap mounted to a pipe comprising a frame having a threaded hole, a screw with a first end and an opposite second end threadedly mounted in the hole and extendable lengthwise with the pipe, a hook shaped end cap engager mounted to the first end of the screw and hookingly engagably with the cap, a pipe engager mounted to the frame and extendable against the pipe, and, a handle mounted to the second end of the screw for the turning of the screw to force the cap engager and cap away from the pipe engager and pipe.

A further embodiment of the present invention is an apparatus for removing an end cap from a sewer lateral pipe wherein the pipe includes an end portion with an outwardly extending ridge formed thereon and the end cap includes a continuous circumferential flange with depending leg stops abutting the end portion of the pipe and spacing the flange therefrom with the apparatus comprising a frame having a threaded hole, a screw with a first end and an opposite second end threadedly mounted in the hole, the screw having a longitudinal axis extending when the apparatus is mounted on the pipe lengthwise with the pipe, a cap engager mounted to the first end of the screw and including at least two hook shaped fingers with distal ends of height less than the leg stops to fit hookingly between the flange and the end portion when the leg stops abut the end portion of the pipe, a pipe engager mounter to the frame and extendable against the ridge of the pipe, and, a handle mounted to the second end of the screw for the turning of the screw to force the cap engager and cap away from the pipe engager and pipe.

Yet another embodiment of the present invention is a device for removing a plastic end cap from a plastic pipe comprising a frame, a screw threadedly mounted to the frame and having a first handled end and a second end, a pair of fingers rotatably and pivotally mounted to the second end of the screw and having mutually facing inwardly turned ends sized to fit between the cap and the pipe, and, a pipe engager rotatably and pivotally mounted to the frame outwardly of the fingers with the pipe engager extending abutingly against the pipe and including means for limiting relative motion therebetween as the screw is turned forcing the fingers and cap apart from the pipe engager and the pipe.

It is an object of the present invention to provide a tool for removing an end cap from a sewer lateral pipe.

A further object of the present invention is to provide a new and improved method for removing an end cap from a sewer lateral pipe.

In addition, it is object of the present invention to provide a device for removing a cap from a pipe utilized in sanitation, petroleum and other applicable service industries.

Related objects and advantages of the present invention will be apparent from the following description.

DESCRIPTION OF THE PREFERRED EMBODIMENT

Figure 1:
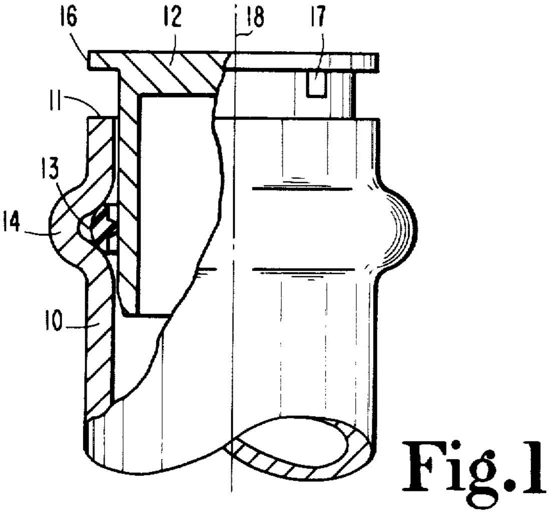
FIG. 1 is a fragmentary cross-sectional view showing a lateral sewer pipe with end cap mounted thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a fragmentary cross-sectional view in FIG. 1 of a sewer lateral pipe 10 having a cylindrical main body with an open end 11 and an end opposite from end 11 connected to the main sewer line. Open end 11 is removably closed by an end cap 12 sized to fit sealingly within pipe 10 and being engaged by a conventional O-ring seal 13 fixedly mounted interiorally within ridge 14 formed on the main body of pipe 10. End cap 12 has a cylindrical main body with a tapered end to facilitate insertion of the end cap into the pipe. A flange 16 extends radially outward of and circumferentially around the cylindrical main body of the cap. A plurality of projections or stops 17 are integrally formed on cap 12 and extend from flange 16 toward end 11 and are in abutting engagement with end 11 when the cap is fully mounted to the pipe. Thus, flange 16 is spaced apart from end 11 at all times to allow an removable tool to be inserted between flange 16 and end 11 facilitating the removal of the cap from the pipe. The pipe and cap have a longitudinal axis 18 extending centrally therethrough. The pipe and cap shown in FIG. 1 are typically produced from polyvinyl chloride material and are commercially available.

Tool 20 includes an elongated frame member 21 having a pair of opposite ends 22 and 23 each one of which has pivotally mounted thereto and depending therefrom a downwardly extending leg 24 and 25. Legs 24 and 25 have distal ends 26 and 27, respectively, removably secured to a pair of ears 28 and 29 by conventional fastening devices 30. Ears 28 and 29 are integrally connected to a pair of semi-circular members 31 and 32 having their adjacent ends removably connected together forming a ring 33 which will slip around pipe 10 resting atop ridge 14. The adjacent ends of semi-circular members 31 and 32 have bosses integrally attached thereto. For example, rings 31 and 32 have adjacent bosses 34 and 35 integrally provided thereon with a conventional threaded member 36 being pivotally mounted by conventional fastener 37 to boss 34 with the opposite end of threaded member 36 extending through boss 35. A conventional wing nut 38 is threadedly mounted to member 36 to facilitate tightening of the adjacent semi-circular portions. Likewise, similar bosses and a threaded member are provided on the other ends of semi-circular members 34 and 35 to allow ring 33 to be sized depending upon the diameter of pipe 10. Fasteners 30 may be removed to allow removal of ring 33 and remounting of a different sized ring to legs 24 and 25 depending upon the diameter of pipe 10.

A plurality of threaded members 40 are mounted to ring 33 and extend radially inward toward the longitudinal center axis 41 of the tool. Threaded members 40 may be screwed inwardly until the inner ends contact pipe 10 limiting relative motion between the ring and the pipe. The threaded members 40 may be utilized in the event pipe 10 is not provided with a ridge 14.

A threaded torque screw 42 is threadedly mounted to frame member 21 and is in meshing engagement with the internal threads of hole 43 provided in the frame member. The top end of screw 40 is provided with a handle 44 whereas the bottom end 45 is rotatably mounted to member 46 having a pair of opposite ends 47 and 48 to which are pivotally mounted downwardly extending fingers 49 and 50, respectively. The fingers include distal ends 51 and 52 located at diagonally opposite locations and are movable to and from axis 41 to a position between flange 16 and end 11 of pipe 10 to accommodate different sizes of caps. Fingers 51 and 52 have a height in the direction of axis 41 of a size less than the height of stop 17 thereby ensuring that the fingers may fit between flange 16 and end 11 even though the cap is securely and completely mounted to the pipe. A conventional bearing 53 is provided on member 46 to rotatably mount screw 42. Thus, the screw may be rotated causing the screw to move along axis 41 relative to member 21 thereby pulling member 46 along with fingers 49 and 50 which pull cap 12 apart from pipe 10. Bushing 53 allows for rotatable motion of screw 42 relative to member 46, but prevents longitudinal motion of screw 42 along axis 41 relative to member 46.

Figure 2:
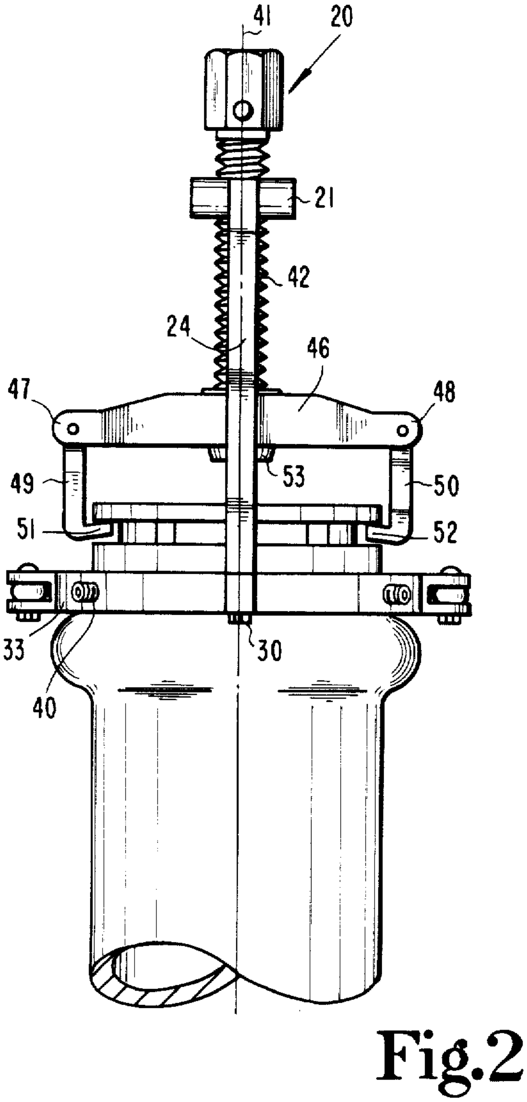
FIG. 2 is a side view of a tool for removing the end cap from the lateral sewer pipe shown in FIG. 1.
Figure 3:
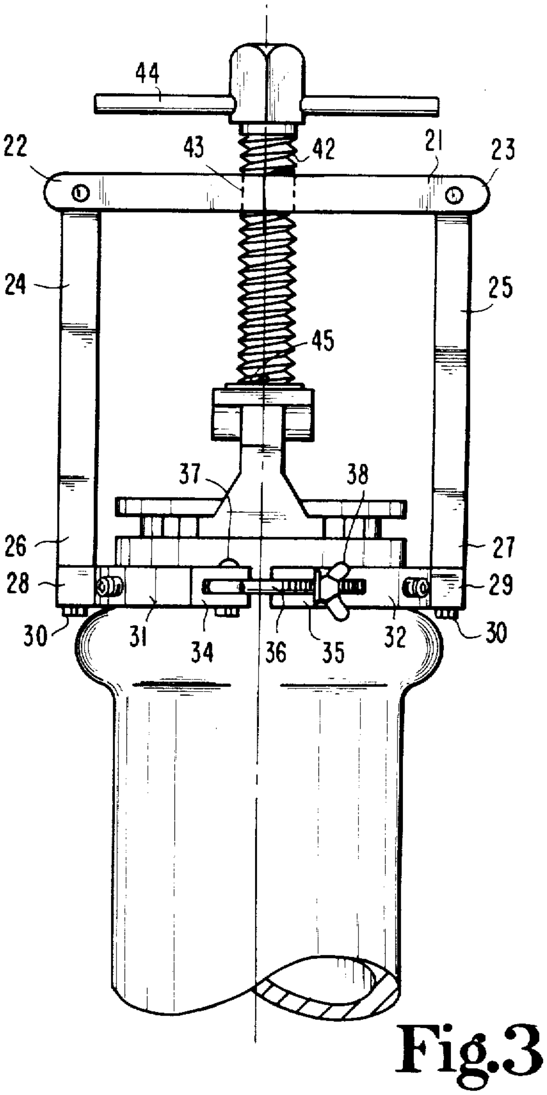
FIG. 3 is a right hand side view of the tool shown in FIG. 2.

Screw 42 extends along axis 41 lengthwise with pipe 10. The pair of downwardly extending fingers 49 and 50 as viewed in FIG. 2 form a hook-shaped end cap engager which is hookingly engagable with the cap whereas legs 24 and 25 along with ring 33 form a pipe engager mounted to frame member 21. As handle 44 is rotated, the cap engager and cap are forced away or apart from the pipe engager and pipe. Whereas the cap engager is extendable to at least two locations between the cap and the pipe, the pipe engager extends circumferentially around the pipe. Both members 21 and 46 extend at right angles relative to axis 41 and screw 42. Legs 24 and 25 along with ring 33 are located outwardly of fingers 49 and 50. The smaller member 46 is rotatably mounted to screw 42 and independently of the rotatable mounting of member 21 on screw 42.

The method of preparing a lateral sewer pipe having an end cap thereon for connection to a sewer outlet pipe from a building such as a house includes the steps of first digging the hole to the lateral sewer pipe and uncovering the enclosure. Next, ring 33 or the frame of the tool is removably mounted to the lateral sewer pipe. Handle 44 is threadedly moved in a direction towards the pipe to position the cap engager adjacent the cap and the end of the pipe. The cap engager is then moved between the cap and the pipe and the rotation of the screw is reversed thereby threadedly moving the screw in a direction opposite and apart from the pipe removing the cap therefrom.

The consturction of the tool shown in the drawing includes, but is not limited to, a plurality of ferrous, non-ferrous and thermoplastic materials, that is, aluminum, magnesium, titanium steel/alloy steel, stainless steel, nylon, and other plastic materials. The design and mechanics of the tool is such to facilitate use in adverse environmental conditions inherent in the employment of the tool including corrosive atmospheres, inclement weather, habitats and normal operational abuse.

The general operation of the tool is manifested by clamping an annular ring or rings circumferentially around the service pipe and positioning the radially inward extending pressure tabs adjacent to the diametrically protruding pipe cap or outer sleeve. Subsequently, the torque screw or screws connected to the pressure tabs can be rotated independently or simultaneously to induce a longitudinal upward force thus extracting the pipe cap or sleeve from construction pipe. The present invention includes utilizing either a single screw 42 or a plurality of screws attached to fingers 49 and 50.

The removal of the tool for use on repeated applications is a direct reversal of the installation sequence. The tool affords the accommodation of the utilization of a myriad of extruded preformed pipe/cap sizes in construction configurations. It is anticipated that the tool can be provided in different sizes to remove a variety of different diametered end caps. Further, the tool may be provided in kit form with a plurality of rings provided in the kit to be utilized depending upon the diameter of the pipe.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An extractor for removing an end cap mounted to a pipe wherein said pipe includes an outwardly extending ridge, comprising:

a frame having a threaded hole;

a screw with a first end and an opposite second end threadedly mounted in said hole and extendable lengthwise with said pipe;

a hook shaped end cap engager mounted to said first end of said screw hookingly engagable with said cap and including a pair of arms pivotally mounted thereto;

a pipe engager mounter to said frame and extendable against said pipe and including two depending legs pivotably mounted to said frame and a ring comprising plural ring segments mounted to said legs, said ring surrounding said pipe and being engagable with said ridge, said ring having mutually facing surfaces positionable around said pipe with said surfaces being a fixed distance apart; means connected to said ring segments for quickly attaching and detaching said ring segments to each other; and, a handle mounted to said second end of said screw for the turning of said screw to force said ring against said ridge and away from said second end of said screw and to force said cap engager and cap away from said pipe engager and pipe.

2. The extractor of claim 1 wherein:

said cap engager is extendable to at least two locations adjacent said cap between said cap and said pipe, and said ring includes a pair of semi-circular portions surrounding said pipe.

3. The extractor of claim 2 wherein:

the legs and ring of said pipe engager are arranged to allow replacement of said ring to fittingly correspond with the diameter of said pipe.

4. The extractor of claim 3 wherein:

said pipe engager includes a plurality of inwardly extending adjustable fasteners mounted to said ring and abutable against said pipe limiting relative motion between said ring and said pipe.

5. The extractor of claim 3 wherein:

the semi-circular portions are removably mounted to said legs with opposite adjacent ends removably and adjustably secured together to allow said ring to be removed from said legs and to allow said ring to be adjustably fitted against said pipe.

6. The extractor of claim 2 wherein:

said end cap engager includes a member rotatably mounted to said first end of said screw with said pair of arms having proximal ends pivotally mounted to said member and distal hook shaped ends sized to fit between said cap and said pipe to engage said cap.

7. The extractor of claim 6 wherein:

said member and said arms are arranged to allow movement of said arms to fittingly correspond with the diameter of said cap.

8. An apparatus for removing an end cap from a sewer lateral pipe wherein the pipe includes an end portion with an outwardly extending ridge formed thereon and the end cap includes a continuous circumferential flange with depending leg stops abutting the end portion of the pipe and spacing the flange therefrom with said apparatus comprising:

a frame having a threaded hole;

a screw with a first end and an opposite second end threadedly mounted in said hole, said screw having a longitudinal axis extending when said apparatus is mounted on said pipe lengthwise with said pipe;

a cap engager mounted to said first end of said screw and including at least two hook shaped fingers with distal ends of height less than said leg stops to fit hookingly between said flange and said end portion when said leg stops abut said end portion of said pipe;

a pipe engager mounted to said frame and extendable against said ridge of said pipe and including two legs pivotally mounted to said frame and a ring comprising plural ring segments connected to said legs to fit circumferentially around said pipe; said ring having mutually facing surfaces positionable around said pipe with said surfaces being a fixed distance apart; means connected to said ring segments for quickly attaching and detaching said ring segments to each other; and, a handle mounted to said second end of said screw for the turning of said screw to force said ring against said ridge and away from said second end of said screw and to force said cap engager and cap away from said pipe engager and pipe.

9. The apparatus of claim 8 wherein:

said cap engager includes a first member rotatably mounted and extending at right angles relative to said screw with opposite ends.

said two fingers are pivotally mounted to said opposite ends and extend toward said pipe, said fingers include distal ends located at diagonally opposite locations and are movable to and from said axis between said flange and said pipe to accommodate different sizes of said cap.

10. The apparatus of claim 9 wherein:

said frame includes a second member extending at right angles relative to said screw outwardly of said first member and including second opposite end portions, said second member is rotatably mounted to said screw independently of the rotatable mounting of said first member to said screw; and, the legs of said pipe engager are pivotally mounted to said second opposite end portions and extend outwardly of said fingers toward said pipe with the ring of said pipe engager resting substantially entirely contiguously upon said ridge.

11. The apparatus of claim 10 wherein:

said ring includes two mating semi-circular portions with opposite adjacent ends removably and adjustably secured together to allow said ring to be removed from said legs and to allow said ring to be adjustably fitted against said pipe.

* * * * *

* * * * *

UNITED STATES PATENT AND TRADEMARK OFFICE

CERTIFICATE OF CORRECTION

PATENT NO. : 4,691,424

DATED : September 8, 1987

INVENTOR(S) : Schmidt et al.

It is certified that error appears in the above-identified patent and that said Letters Patent is hereby corrected as shown below:

In column 2, line 6, please change "mounter" to --mounted--.

In column 3, line 39, please change "pluraity" to --plurality--.

In column 4, line 32, please change "consturction" to --construction--.

In column 5, line 15, please change "mounter" to --mounted--.

In column 6, line 35, please change the period to a comma.

Signed and Sealed this

Fifth Day of July, 1988

*Attest:*

DONALD J. QUIGG

*Attesting Officer*

*Commissioner of Patents and Trademarks*